United States Patent
Hatori et al.

(10) Patent No.: US 12,038,763 B2
(45) Date of Patent: Jul. 16, 2024

(54) RESCUE SYSTEM

(71) Applicant: HONDA MOTOR CO., LTD., Tokyo (JP)

(72) Inventors: Satoshi Hatori, Wako (JP); Akifumi Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 17/670,776

(22) Filed: Feb. 14, 2022

(65) Prior Publication Data

US 2022/0291695 A1    Sep. 15, 2022

(30) Foreign Application Priority Data

Mar. 12, 2021    (JP) .................................. 2021-040453

(51) Int. Cl.
  *G05D 1/00* (2024.01)
  *G07C 5/00* (2006.01)
  *G08G 1/00* (2006.01)

(52) U.S. Cl.
  CPC .......... *G05D 1/0287* (2013.01); *G07C 5/008* (2013.01); *G08G 1/202* (2013.01); *G08G 1/205* (2013.01)

(58) Field of Classification Search
  CPC .......... G05D 1/0287; G05D 2201/021; G05D 1/0297; G07C 5/008; G08G 1/202; G08G 1/205
  See application file for complete search history.

(56) References Cited

U.S. PATENT DOCUMENTS

| | | | |
|---|---|---|---|
| 2019/0129419 A1* | 5/2019 | Lee | G05D 1/0261 |
| 2020/0215447 A1* | 7/2020 | Choi | A63H 13/04 |
| 2020/0265720 A1* | 8/2020 | Uehara | H04W 4/021 |

FOREIGN PATENT DOCUMENTS

| | | | |
|---|---|---|---|
| JP | H05333191 A | * | 6/1992 |
| JP | 2009-050970 | | 3/2009 |
| JP | 5282457 B2 | * | 9/2013 |
| JP | 2020-123192 | | 8/2020 |

* cited by examiner

*Primary Examiner* — Isaac G Smith
*Assistant Examiner* — Nikki Marie M Molina
(74) *Attorney, Agent, or Firm* — Rankin, Hill & Clark LLP

(57) ABSTRACT

A rescue system includes a plurality of autonomous working machines and a management device capable of communicating with each of the autonomous working machines, each of the autonomous working machines includes self-location identification means for identifying a self-location of the autonomous working machine, and autonomous travel possibility determination means for determining whether the autonomous working machine can travel autonomously based on a result of identification by the self-location identification means, and the management device includes rescue dispatch means for dispatching an autonomous working machine to the rescue of another autonomous working machine which is determined by the autonomous travel possibility determination means as being in a state of being unable to travel autonomously.

7 Claims, 8 Drawing Sheets

RESCUE SYSTEM

INCORPORATION BY REFERENCE

The present application claims priority under 35 U.S.C. § 119 to Japanese Patent Application No. 2021-040453 filed on Mar. 12, 2021. The content of the application is incorporated herein by reference in its entirety.

BACKGROUND OF THE INVENTION

Field of the Invention

The present invention relates to rescue systems.

Description of the Related Art

A delivery system is known which includes a plurality of autonomous moving bodies, each of the moving bodies delivering packages, wherein when the moving body is trapped in a situation where the moving body cannot travel autonomously any more, a human operator is allowed to operate the moving body manually with the use of a remote-control device (see Japanese Patent Laid-Open No. 2020-123192, for example). With this system, a moving body does not need to be recovered by a human operator when the moving body is trapped in a situation where the moving body cannot travel autonomously. Rather, a human operator can remotely operate the moving body manually to get out of the situation so that the moving body can reach its destination.

A robotic system is also known which includes a plurality of autonomous robots wherein when any of the autonomous robots has an abnormality, another robot rescues the robot from the abnormal condition, the other robot including a plurality of abnormal condition detection means configured to detect an abnormal condition of the robot and rescue operation means configured to perform rescue operations depending on the abnormal condition detected by the abnormal condition detection means (see Japanese Patent Laid-Open No. 2009-050970, for example).

The technique described in Japanese Patent Laid-Open No. 2020-123192 requires an operator to operate a moving body when the moving body cannot travel autonomously and thus requires human resources.

The technique described in Japanese Patent Laid-Open No. 2009-050970 does not enable a robot to perform rescue operations for another robot when the robots are not within a reasonable distance from each other for detecting an abnormal condition of the other robot.

An object of the present invention is to provide a rescue system for rescuing an autonomous working machine more appropriately when the autonomous working machine is in a state of being unable to travel autonomously.

SUMMARY OF THE INVENTION

According to an aspect of the present invention, a rescue system includes a plurality of autonomous working machines and a management device capable of communicating with each of the autonomous working machines, each of the autonomous working machines includes self-location identification means for identifying a self-location of the autonomous working machine, and autonomous travel possibility determination means for determining whether the autonomous working machine is able to travel autonomously based on a result of identification by the self-location identification means, and the management device includes rescue dispatch means for dispatching an autonomous working machine to the rescue of another autonomous working machine which is determined by the autonomous travel possibility determination means as being in a state of being unable to travel autonomously.

According to another aspect of the present invention, in the above-mentioned rescue system, each of the autonomous working machines further includes information transmission control means for performing control to intermittently transmit, to the management device, autonomous travel possibility information indicating a result of determining whether the autonomous working machine is able to travel autonomously, and the rescue dispatch means of the management device detects an autonomous working machine being in a state of being unable to travel autonomously for a first predetermined period of time based on the autonomous travel possibility information, and dispatches another autonomous working machine to the rescue of the detected autonomous working machine.

According to another aspect of the present invention, in the above-mentioned rescue system, each of the autonomous working machines further includes rescue request control means for performing control to transmit, to the management device, information usable for identifying a location at which the autonomous working machine is in a state of being unable to travel autonomously and a request for rescue if the autonomous travel possibility determination means determines that the autonomous working machine is in a state of being unable to travel autonomously for a second predetermined period of time.

According to another aspect of the present invention, in the above-mentioned rescue system, the rescue dispatch means of the management device dispatches an autonomous working machine of which the self-location identification means uses a self-location identification technique different from a self-location identification technique used in an autonomous working machine to be rescued.

According to another aspect of the present invention, in the above-mentioned rescue system, the rescue dispatch means of the management device dispatches an autonomous working machine located closest to another autonomous working machine to be rescued.

According to another aspect of the present invention, in the above-mentioned rescue system, each of the autonomous working machines further includes rescuing machine detection means for detecting another autonomous working machine that comes to the rescue of the autonomous working machine, and follow-up travel control means for performing control to travel by following up the other autonomous working machine.

According to another aspect of the present invention, in the above-mentioned rescue system, the rescue dispatch means of the management device dispatches an autonomous working machine including towing means if an autonomous working machine to be rescued is unable to detect another autonomous working machine that comes to the rescue of the autonomous working machine to be rescued.

According to another aspect of the present invention, in the above-mentioned rescue system, each of the autonomous working machines resumes autonomous traveling if the autonomous travel possibility determination means determines that the autonomous working machine is in a state of being able to travel autonomously when the autonomous working machine is moving with an aid of another autonomous working machine that comes to the rescue of the autonomous working machine.

According to another aspect of the present invention, in the above-mentioned rescue system, the management device further includes storage means for storing information on a location at which an autonomous working machine to be rescued is in a state of being unable to travel autonomously.

Advantageous Effect of the Invention

According to the aspects of the present invention, an autonomous working machine in a state of being unable to travel autonomously can be rescued more appropriately.

DETAILED DESCRIPTION OF THE PREFERRED EMBODIMENTS

Embodiments of the present invention are now described with reference to the drawings.

(First Embodiment)

Figure 1:
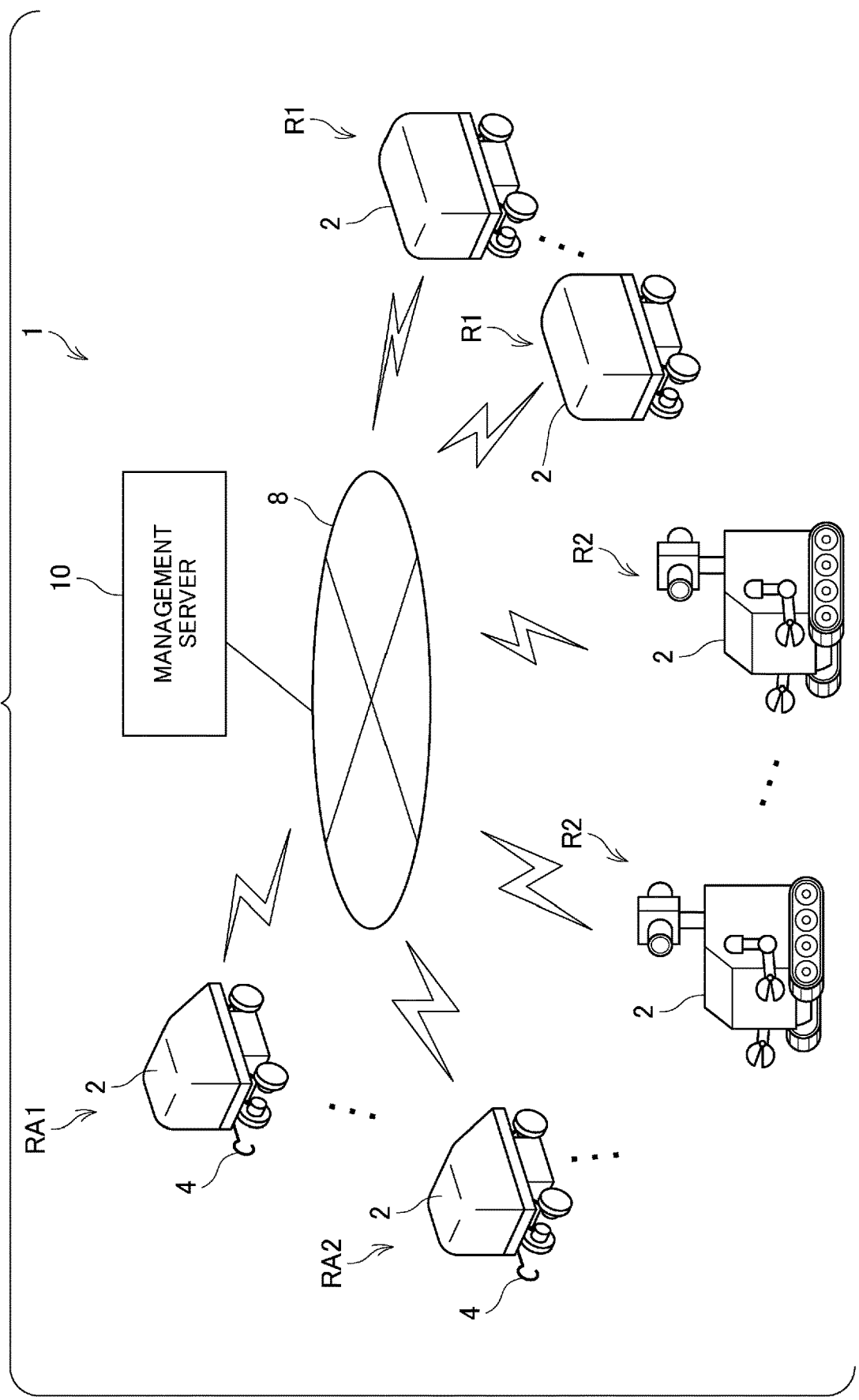
FIG. 1 is a diagram illustrating a rescue system according to a first embodiment of the present invention.

FIG. 1 is a diagram illustrating a rescue system 1 according to the present embodiment.

The rescue system 1 includes a plurality of first working machines R1, a plurality of second working machines R2, a plurality of first tow working machines RA1, a plurality of second tow working machines RA2, and a management server 10 that communicates with them through any suitable telecommunication line 8.

Each of the first working machines R1, the second working machines R2, the first tow working machines RA1 and the second tow working machines RA2 is an autonomous working machine that has a body 2 to perform predetermined tasks and is configured to be able to travel autonomously. The predetermined tasks include appropriate tasks, such as transport, mowing, farming, security, cleaning, guiding and tow.

The rescue system 1, when any one of the plurality of first working machines R1 and the plurality of second working machines R2 gets into a state of being unable to travel autonomously, ensures smooth rescue by the management server 10 dispatching an appropriate autonomous working machine among the other first working machines R1, the other second working machines R2, the first tow working machines RA1 and the second tow working machines RA2 for rescue.

In the following, an autonomous working machine that goes to rescues another working machine is referred to as a "rescuing machine" and an autonomous working machine that gets into a state of being unable to travel autonomously and is in need of rescue is referred to as a "rescued machine."

Figure 2:
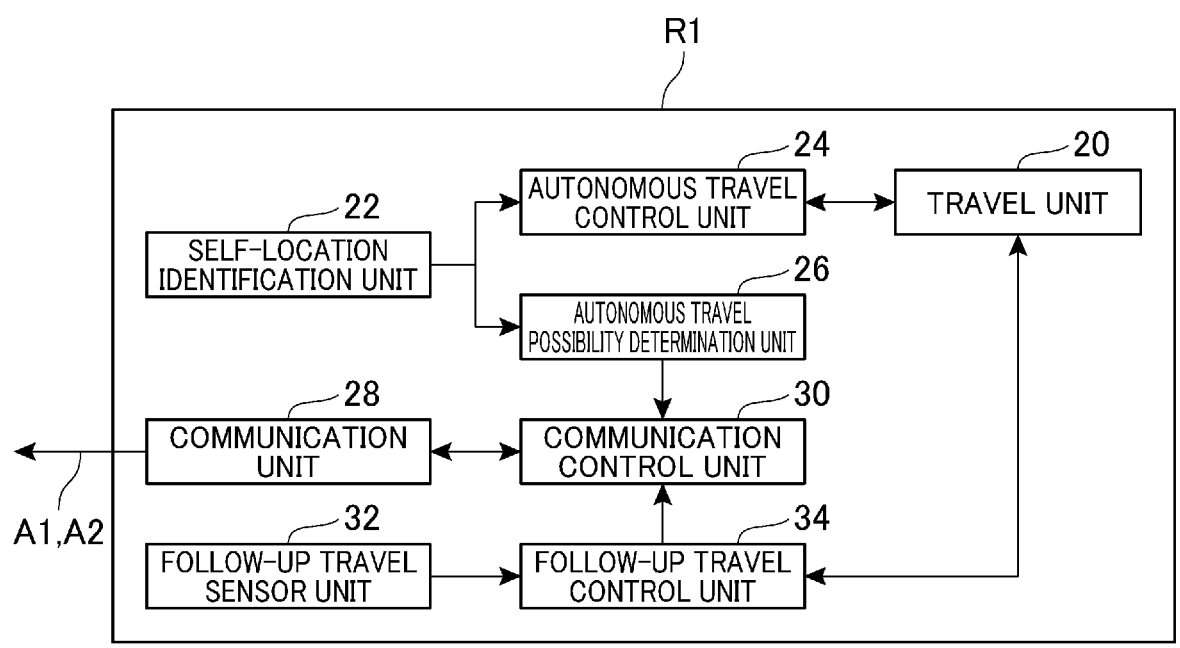
FIG. 2 is a diagram illustrating a functional configuration of a first working machine.

FIG. 2 is a diagram illustrating a functional configuration of a first working machine R1.

The first working machine R1 includes a travel unit 20, a self-location identification unit 22, an autonomous travel control unit 24, an autonomous travel possibility determination unit 26, a communication unit 28, a communication control unit 30, a follow-up travel sensor unit 32 and a follow-up travel control unit 34.

The travel unit 20 includes mechanical components and electrical components required for the body of the first working machine R1 to travel, i.e., includes wheels, a steering mechanism to control the steering angles of the wheels and a driving mechanism having a power source to drive the wheels. If the first working machine R1 is an electric vehicle and the power source is an electric motor, in addition to the electric motor that drives and rotates the wheels, the driving mechanism further includes an inverter that drives the motor, a battery that serves as an energy source and a DC-DC converter that converts electric power from the battery. The power source included in the driving mechanism may be an internal combustion engine, or a hybrid of an electric motor and an internal combustion engine.

The self-location identification unit 22 is a device that identifies the location (self-location) of the first working machine R1 by using a publicly known or well-known appropriate method. The self-location identification unit 22 includes one or more sensors and a processor that calculates the self-location based on detection results of the sensors. For example, GNSS sensors, light detection and ranging (LiDAR), cameras (CCD sensors), or Time of Flight (TOF) sensors may be appropriately used as the sensors depending on which self-location identification technique is used.

The sensors included in the self-location identification unit 22 according to the present embodiment are the above-mentioned GNSS sensors that receive GNSS signals transmitted from positioning satellites, and the processor calculates the self-location based on the GNSS signals.

The autonomous travel control unit 24 includes a computer that controls the travel unit 20 based on the self-location so that the first working machine R1 can travel autonomously. A publicly known or well-known method is used as appropriate for the control of autonomous travel.

The autonomous travel possibility determination unit 26 includes a computer that determines whether the first working machine R1 is in a state of being unable to travel autonomously based on a result of the identification by the self-location identification unit 22.

More specifically, in the present embodiment, a state where the first working machine R1 cannot travel autonomously refers to a state where self-location identification operation in the self-location identification unit 22 fails due to environmental factors, particularly, a state where an error in the self-location identified by the self-location identification unit 22 exceeds a predetermined value, or a state where the self-location cannot be determined by the self-location identification unit 22.

For example, when the first working machine R1 is located behind some building and therefore its receiving sensitivity of GNSS signals decreases, an error in the self-location may become equal to or larger than a predetermined value, making the self-location uncertain. Moreover, when GNSS signals are not received, the self-location identification unit 22 cannot identify the self-location. That is, when the detection accuracies of the sensors included in the autonomous travel possibility determination unit 26, for example, decreases due to some environmental factors, the self-location identified by the self-location identification unit 22 may include an error equal to or larger than a predetermined value and therefore the autonomous travel possibility determination unit 26 may determine that the first working machine R1 is in a state of being unable to travel autonomously.

The communication unit 28 includes a communication device (a device including a receiving circuit and a transmitting circuit) that communicates with the management server 10 through the telecommunication line 8.

The communication control unit 30 is a computer that controls communication with the management server 10. The communication control unit 30 according to the present embodiment generate autonomous travel possibility information A1 indicating whether the first working machine R1 can travel autonomously based on a result of the determination by the autonomous travel possibility determination unit 26 and performs autonomous travel possibility information transmission control to transmit the autonomous travel possibility information A1 intermittently from the communication unit 28 to the management server 10. The transmission interval of the autonomous travel possibility information A1 can be set as desired. In the present embodiment, the communication control unit 30 transmits the autonomous travel possibility information A1 at regular intervals so that multiple pieces of the autonomous travel possibility information A1 generated in each interval are transmitted together. The communication control unit 30, every time a predetermined number, which is one or more, of pieces of the autonomous travel possibility information A1 are generated, may transmit the predetermined number of pieces of the autonomous travel possibility information A1.

The follow-up travel sensor unit 32 and the follow-up travel control unit 34 are provided for the first working machine R1 to travel by following up a rescuing machine that comes to the rescue of the first working machine R1. More specifically, the follow-up travel sensor unit 32 includes any suitable sensor such as a camera (CCD sensor) to detect a rescuing machine.

The follow-up travel control unit 34 includes a computer having a rescuing machine identification function that identifies a rescuing machine based on a result of the detection by the follow-up travel sensor unit 32, a follow-up travel control execution function that controls the travel unit 20 so that the first working machine R1 travels by following up the movement of the rescuing machine, and a follow-up travel possibility determination function that determines whether it is possible for the first working machine R1 to travel by following up the rescuing machine based on the operating status of the follow-up travel sensor unit 32.

The communication control unit 30 generates follow-up travel possibility information A2 indicating whether it is possible for the first working machine R1 to travel by following up the rescuing machine based on a result of the determination by the follow-up travel control unit 34, and transmits the follow-up travel possibility information A2 to the management server 10.

Timing of determining whether it is possible for the first working machine R1 to travel by following up the rescuing machine and timing of transmitting the follow-up travel possibility information A2 can be set as desired. In the present embodiment, the follow-up travel control unit 34 determines whether it is possible for the first working machine R1 to travel by following up the rescuing machine when the autonomous travel possibility determination unit 26 determines that the first working machine R1 is in a state of being unable to travel autonomously, and then the communication control unit 30 transmits the follow-up travel possibility information A2 based on a result of this determination by the follow-up travel control unit 34.

Some or all of the autonomous travel control unit 24, the autonomous travel possibility determination unit 26, the communication control unit 30 and the follow-up travel control unit 34 in the first working machine R1 may be implemented in one computer. A "computer" refers to a device including at least a processor such as a CPU and an MPU, a memory device such as a ROM and RAM, and an interface circuit to connect sensors, peripheral devices, or the like.

A second working machine R2 has the same functional configuration as that of the first working machine R1.

A difference between the second working machine R2 and the first working machine R1 is the method used by the self-location identification unit 22 to identify the self-location. In the present embodiment, the self-location identification unit 22 of the second working machine R2 includes LiDAR sensors as its sensors, and its processor uses Simultaneous Localization and Mapping (SLAM) to identify the self-location.

Predetermined tasks performed by the second working machines R2 may be different from those performed by the first working machines R1.

Figure 3:
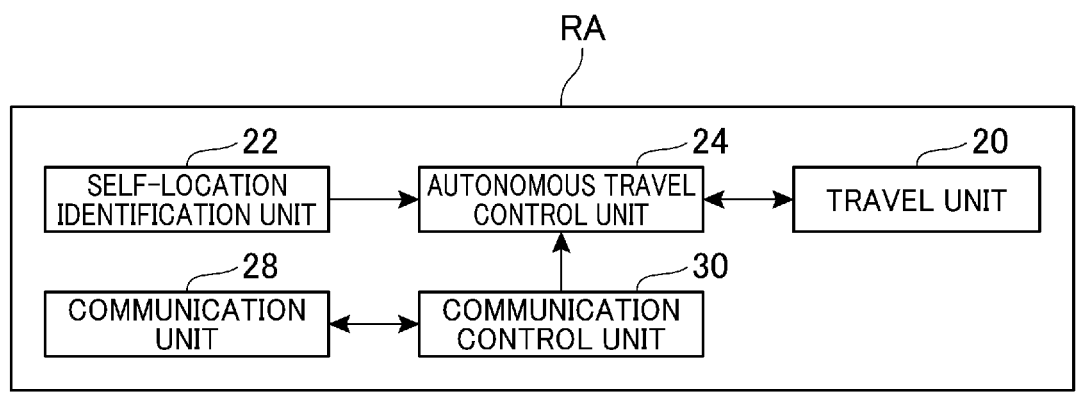
FIG. 3 is a diagram illustrating a functional configuration of a first tow working machine.

FIG. 3 is a diagram illustrating a functional configuration of a first tow working machine RA1.

The first tow working machine RA1 is an autonomous working machine that performs towing operations for a rescued machine according to instructions from the management server 10.

That is, the body 2 of the first tow working machine RA1 includes a towing gear 4 to tow a rescued machine as shown in FIG. 1. The towing gear 4 may be any suitable equipment that includes a coupling component such as a hook to be coupled to the body 2 of a rescued machine. As with the first working machine R1 and the second working machine R2, the first tow working machine RA1 includes a travel unit 20, a self-location identification unit 22, an autonomous travel control unit 24, a communication unit 28 and communication control unit 30 as shown in FIG. 3. The first tow working machine RA1 according to the present embodiment uses the same self-location identification technique in the self-location identification unit 22 as that used in the first working machine R1.

The first tow working machine RA1 travels to a rescued machine autonomously by the communication control unit 30 obtaining location information of a rescued machine or route information to reach the rescued machine from the management server 10 and by the autonomous travel control unit 24 performing control of autonomous travel based on the location information or the route information.

A second tow working machine RA2 has the same functional configuration as that of the first tow working machine RA1.

A difference between the second tow working machine RA2 and the first tow working machine RA1 is the method used by the self-location identification unit 22 to identify the self-location. In particular, in the present embodiment, the second tow working machine RA2 uses the same self-location identification technique in the self-location identification unit 22 as that used in the second working machine R2.

Figure 4:
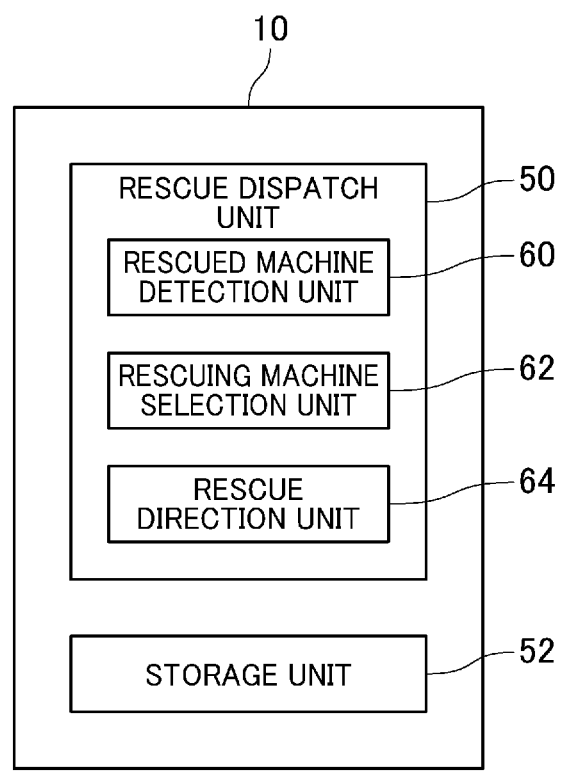
FIG. 4 is a diagram illustrating a functional configuration of a management server.

FIG. 4 is a diagram illustrating a functional configuration of the management server 10.

The management server 10 is a computer including a processor such as a CPU and an MPU, a memory device such as a ROM and a RAM, a storage device such as an HDD and an SSD, an interface circuit to connect sensors, peripheral devices and the like, and communication devices (a receiving device and a transmitting device) to communicate through the telecommunication line 8. The functional configuration shown in FIG. 4 is implemented by the processor executing computer programs stored in the memory device or the storage device.

As shown in FIG. 4, the management server 10 includes, as its functional components, a rescue dispatch unit 50 that is configured with a processor and that implements a function of dispatching a rescuing machine to rescue a rescued machine, and a storage unit 52 (memory) that stores, in the storage device, information on a location at which a rescued machine is in a state of being unable to travel autonomously.

The rescue dispatch unit 50 also includes a rescued machine detection unit 60, a rescuing machine selection unit 62 and a rescue direction unit 64.

The rescued machine detection unit 60 detects a rescued machine in a state of being unable to travel autonomously among the first working machines R1 and the second working machines R2. The rescued machine detection unit 60 detects as a rescued machine a first working machine R1 or a second working machine that is in a state of being unable to travel autonomously for a first predetermined period of time based on autonomous travel possibility information A1 transmitted by each of the first working machines R1 and the second working machines R2. The first predetermined period of time may be any suitable period of time that is sufficient to determine that a working machine cannot get out of a state of being unable to travel autonomously by itself.

The rescuing machine selection unit 62 selects a rescuing machine to be dispatched to the rescue of the rescued machine among the first working machines R1, the second working machines R2, the first tow working machines RA1 and the second tow working machines RA2. This selection will be described later in the specification.

The rescue direction unit 64 transmits a rescue instruction to direct the rescuing machine selected by the rescuing machine selection unit 62 to the current location of the rescuing machine. The rescue instruction includes information indicating the current location of the rescued machine or route information to reach the current location.

Figure 5:
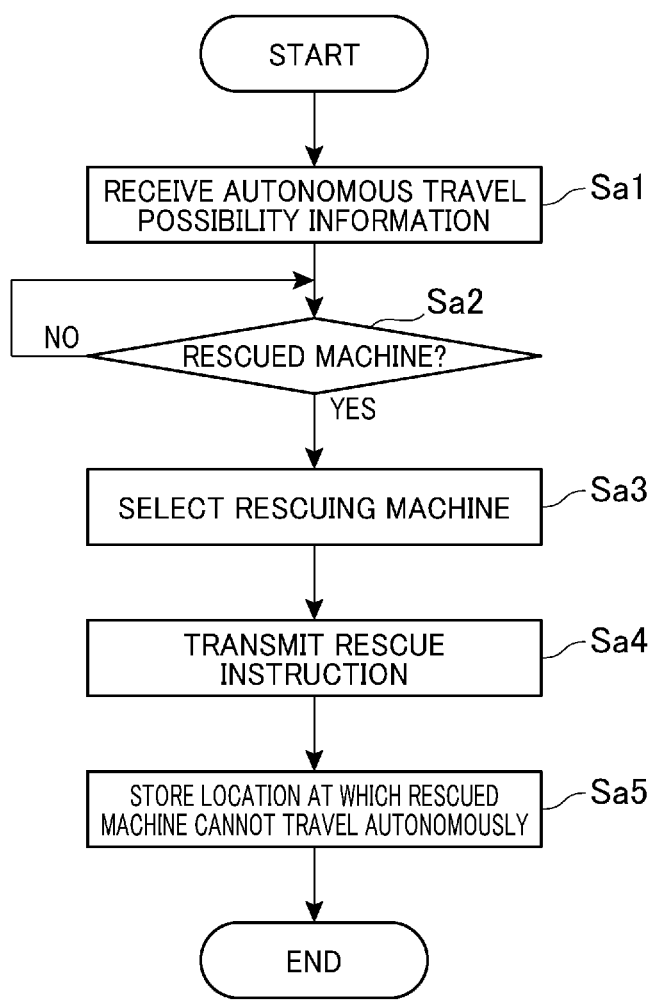
FIG. 5 is a diagram illustrating operations of the management server.

FIG. 5 is a diagram illustrating operations of the management server 10.

The management server 10 receives, by the communication device, autonomous travel possibility information A1 from each of the first working machines R1 and the second working machines R2 (Step Sa1), and then the rescue dispatch unit 50 determines whether there is a rescued machine in need of rescue based on each autonomous travel possibility information A1 (Step Sa2). If there is a rescued machine (YES in Step Sa2), the rescue dispatch unit 50 selects a rescuing machine from among the first working machines R1, the second working machines R2, the first tow working machines RA1 and the second tow working machines RA2 (Step Sa3) and transmits a rescue instruction to the selected rescuing machine (Step Sa4). As a result, the rescuing machine starts autonomous traveling to the rescue of the rescued machine.

After that, the storage unit 52 stores, in the storage device, information on the location at which the rescued machine is in a state of being unable to travel autonomously (Step Sa5). Storing this information enables collection of information on locations at which autonomous working machines are likely to be trapped in a state of being unable to travel autonomously (i.e., locations in the environment that affect self-location identification operation in the self-location identification units 22 of the autonomous working machines) for each of the self-location identification techniques used in the self-location identification units 22, and thus enables autonomous working machines to avoid those locations when the autonomous working machines travel autonomously.

Selection of a rescuing machine in Step Sa3 is now described in detail.

The rescuing machine selection unit 62 first determines whether a rescued machine can travel by following up a rescuing machine based on follow-up travel possibility information A2 transmitted by the rescued machine. If the follow-up travel possibility information A2 is not received, the rescuing machine selection unit 62 may determine that the rescued machine cannot travel by following up a rescuing machine.

If the rescued machine can travel by following up a rescuing machine, the rescuing machine selection unit 62 selects, as a rescuing machine, a working machine located closest to the rescued machine from among one of the first working machines R1 and the second working machines R2, of which self-location identification unit 22 uses a self-location identification technique different from that used in the rescued machine.

If the rescued machine cannot travel by following up a rescuing machine, the rescuing machine selection unit 62 selects, as a rescuing machine, a tow working machine located closest to the rescued machine from among one of the first tow working machines RA1 and the second tow working machines RA2 capable of towing a rescued machine, of which self-location identification unit 22 uses a self-location identification technique different from that used in the rescued machine.

This can reduce time for a rescuing machine to reach a rescued machine by selecting, as the rescuing machine, an autonomous working machine located closest to the rescued machine.

This can also avoid a situation where a rescuing machine cannot identify its self-location and thus cannot travel autonomously for the same reason that has disabled a rescued machine to identify its self-location, by selecting the rescuing machine from among autonomous working machine of which self-location identification unit 22 uses a self-location identification technique different from that used in the rescued machine.

Furthermore, this can ensure that a rescued machine is removed from a location where the rescued machine cannot travel autonomously when the rescued machine cannot travel by following up a rescuing machine by selecting, as the rescuing machine, one of the first tow working machines RA1 and the second tow working machines RA2.

Figure 6:
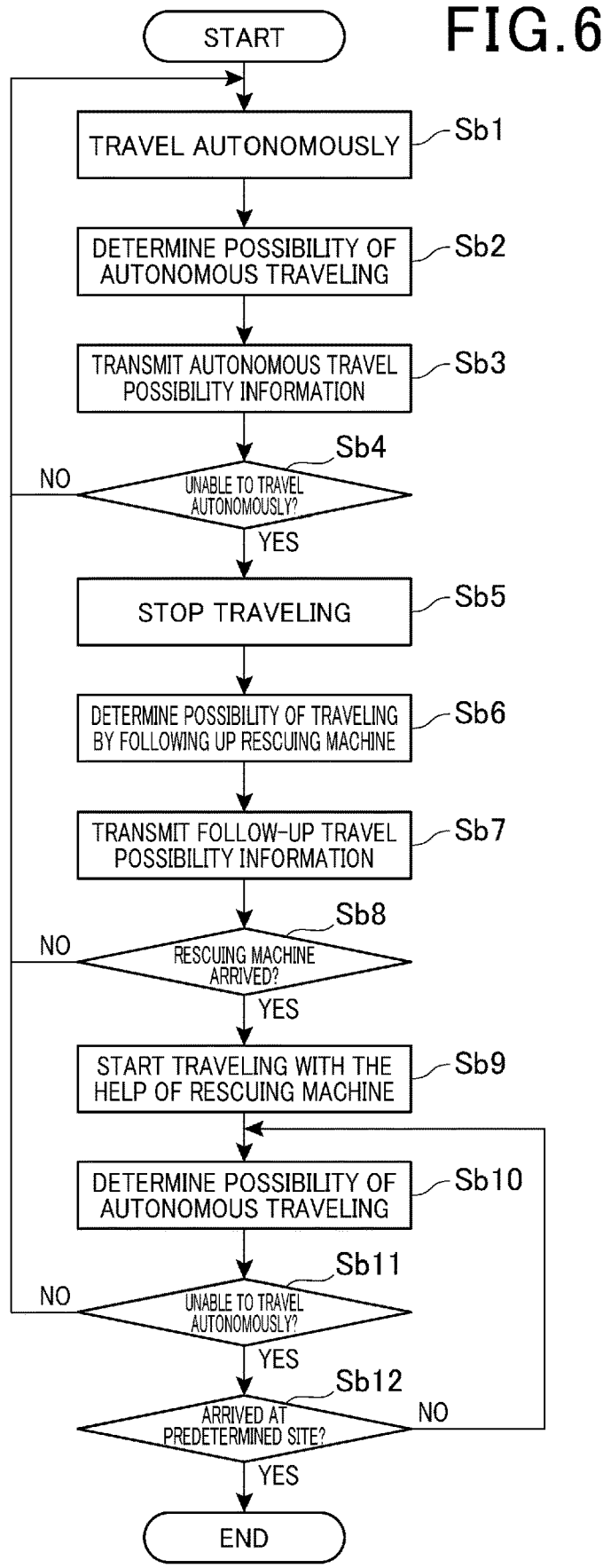
FIG. 6 is a diagram illustrating operations of the first tow working machine.

FIG. 6 is a diagram illustrating operations of a first working machine R1 when the first working machine R1 is traveling autonomously. Operations of a second working machine R2 is the same as those of the first working machine R1.

Once the first working machine R1 starts autonomous traveling under the control of the autonomous travel control unit 24 (Step Sb1), the autonomous travel possibility determination unit 26 first determines whether the first working machine R1 is in a state of being unable to travel autonomously based on a result of the identification by the self-location identification unit 22 (Step Sb2). Then, the communication control unit 30 generates autonomous travel possibility information A1 based on a result of the determination by the autonomous travel possibility determination unit 26, and transmits the autonomous travel possibility information A1 to the management server 10 at any suitable timing (Step Sb3).

If the first working machine R1 can travel autonomously (NO in Step Sb4), the processing procedure returns to Step Sb1 and the first working machine R1 continues to travel autonomously (Step Sb1).

Otherwise, if the first working machine R1 is in a state of being unable to travel autonomously (YES in Step Sb4), the autonomous travel control unit 24 performs stop control (Step Sb5) to stop autonomous traveling of the first working machine R1. Then, the follow-up travel control unit 34 determines whether the first working machine R1 can travel by following up a rescuing machine based on the operating status of the follow-up travel sensor unit 32 (Step Sb6), and the communication control unit 30 generates follow-up travel possibility information A2 based on a result of this determination and transmits the follow-up travel possibility information A2 to the management server 10 (Step Sb7).

As described with reference to FIG. 5, the management server 10 detects the first working machine R1 being in a state of being unable to travel autonomously based on the autonomous travel possibility information A1 in Step Sb3, selects an appropriate rescuing machine based on the follow-up travel possibility information A2 in Step Sb7, and dispatches the rescuing machine to the rescue of the first working machine R1.

In the first working machine R1, the operations from Step Sb1 to Step Sb7 are constantly repeated until arrival of the rescuing machine. In this case, if the autonomous travel possibility determination unit 26 determines that the first working machine R1 can travel autonomously in Step Sb4 before the arrival of the rescuing machine (No in Step Sb4), the autonomous travel control unit 24 performs autonomous travel control (Step Sb1) to start autonomous traveling and thus to resume assigned tasks. In this case, in Step Sb3, the autonomous travel possibility information A1 transmitted by the communication control unit 30 notifies the management server 10 that the first working machine R1 has gotten out of a state of being unable to travel autonomously.

When the rescuing machine arrives (YES in Step Sb8), the first working machine R1 starts traveling with the help of the rescuing machine (Step Sb9). Any suitable publicly known or well-known method can be used for the first working machine R1 to detect arrival of the rescuing machine. In the present embodiment, the follow-up travel sensor unit 32 includes a camera and the follow-up travel control unit 34 executes image recognition processing to recognize the rescuing machine in images captured by the camera, thus detecting arrival of the rescuing machine.

If it is determined that the first working machine R1 cannot travel by following up the rescuing machine in Step Sb6, the rescuing machine is one of the first tow working machines RA1 and the second tow working machines RA2. Otherwise, if it is determined that the first working machine R1 can travel by following up the rescuing machine in Step Sb6, the rescuing machine is a second working machine R2. If the rescuing machine is a first tow working machine RA1 or a second tow working machine RA2, the first working machine RA1 travels by being towed. Otherwise, if the rescuing machine is a second working machine R2, the first working machine R1 travels by following up the second working machine R2.

After the first working machine R1 starts traveling with the help of the rescuing machine and before the first working machine R1 arrives at a predetermined site where the first working machine R1 is to be recovered (NO in Step Sb12), the autonomous travel possibility determination unit 26 repeatedly determines whether the first working machine R1 is in a state of being unable to travel autonomously (Step Sb10). For example, if the environment changes due to the first working machine R1 being moved with the aid of the rescuing machine, and as a result, the receiving environment of GNSS signals improves, the self-location will be identifiable again. If it is determined accordingly that the first working machine R1 can travel autonomously (NO in Step Sb11), the processing procedure returns to Step Sb1 and the first working machine R1 resumes autonomous traveling (Step Sb1) and also resumes assigned tasks. Once the first working machine R1 resumes autonomous traveling, the rescuing machine terminates the rescue operation and returns to a predetermined location autonomously.

If the first working machine R1 is still in a state of being unable to travel autonomously even when the first working machine R1 moves (YES in Step Sb11), when the first working machine R1 arrives at a predetermined site (YES in Step Sb12), the first working machine R1 is recovered by a human worker or the like and undergoes an inspection at the predetermined site.

The present embodiment has the following effects.

In the rescue system 1 according to the present embodiment, each of the first working machines R1 and the second working machines R2, both being autonomous working machines, includes the self-location identification unit 22 that identifies the self-location and the autonomous travel possibility determination unit 26 that determines whether the working machine can travel autonomously based on a result of the identification by the self-location identification unit 22. The management server 10 includes the rescue dispatch unit 50 that dispatches an autonomous working machine to the rescue of a first working machine R1 or a second working machine R2 other than the autonomous working machine if the autonomous travel possibility determination unit 26 of the first working machine R1 or the second working machine R2 determines that the first working machine R1 or the second working machine R2 is in a state of being unable to travel autonomously. The autonomous working machine dispatched to the rescue is a first working machine R1, a second working machine R2, a first tow working machine RA1 or a second tow working machine RA2.

This rescue system 1 can eliminate the need of manual operation and enable rescue operation even when there is no autonomous working machine near an autonomous working machine in need of rescue since the management server 10 dispatches an autonomous working machine to the rescue of the autonomous working machine in need of rescue. This makes rescue more appropriate than the prior art.

In the present embodiment, each of the first working machines R1 and the second working machines R2 includes the communication control unit 30 that performs control to intermittently transmit to the management server 10 autonomous travel possibility information A1 indicating a result of determining whether the working machine can travel autonomously. The rescue dispatch unit 50 of the management server 10 detects an autonomous working machine that is in a state of being unable to travel autonomously for a first predetermined period of time based on autonomous travel possibility information A1, and dispatches another autonomous working machine to the rescue of the detected autonomous working machine.

This configuration makes it possible to quickly detect, by the management server 10, an autonomous working machine that is in a state of being unable to travel autonomously, and to quickly rescue the autonomous working machine.

In the present embodiment, the rescue dispatch unit 50 of the management server 10 dispatches to the rescue an autonomous working machine of which self-location identification unit 22 uses a self-location identification technique different from that used in an autonomous working machine to be rescued (rescued machine).

This can avoid a situation where a rescuing machine cannot identify its self-location and thus cannot travel autonomously for the same reason that has disabled a rescued machine to identify its self-location.

In the present embodiment, the rescue dispatch unit 50 of the management server 10 dispatches, as a rescuing machine to the rescue, an autonomous working machine located closest to an autonomous working machine to be rescued (rescued machine).

This can reduce time for a rescuing machine to reach a rescued machine since an autonomous working machine located closest to the rescued machine is selected as the rescuing machine, thereby rescuing the rescued machine quickly.

In the present embodiment, each of the working machines R1 and the second working machines R2 includes the follow-up travel sensor unit 32 that detects another autonomous working machine that comes to the rescue (rescuing machine), and the follow-up travel control unit 34 that performs control to travel by following up the other autonomous working machine (rescuing machine).

This enables the first working machines R1 and the second working machines R2 to attempt to get out of a state of being unable to travel autonomously by traveling by following up a rescuing machine and thus changing their environment.

In the present embodiment, if an autonomous working machine to be rescued (rescued machine) cannot detect another autonomous working machine that comes to the rescue (rescuing machine), the rescue dispatch unit 50 of the management server 10 dispatches, as the rescuing machine to the rescue, an autonomous working machine (a first tow working machine RA1 or a second tow working machine RA2) including the towing gear 4.

This makes it possible to remove and rescue a rescued machine with more certainty from a location where the rescued machine cannot travel autonomously.

In the present embodiment, each of the first working machines R1 and the second working machines R2 resumes autonomous traveling if the autonomous travel possibility determination unit 26 determines that the working machine is in a state of being able to travel autonomously when the working machine is moving with the aid of another autonomous working machine that comes to the rescue (rescuing machine) (i.e., traveling by following up the rescuing machine or by being towed).

This enables the first working machines R1 and the second working machines R2 to resume autonomous traveling when the working machines move and thereby get out of a state of being unable to travel autonomously, and to get back to work quickly.

In the present embodiment, the management server 10 includes the storage unit 52 that stores information on a location at which an autonomous working machine to be rescued (rescued machine) is in a state of being unable to travel autonomously.

Storing this information enables collection of information on locations at which autonomous working machines are likely to be trapped in a state of being unable to travel autonomously (i.e., locations in the environment that affect self-location identification operation in the self-location identification units 22 of the autonomous working machines) for each of the self-location identification techniques used in the self-location identification units 22, and thus enables autonomous working machines to avoid those locations when the autonomous working machines travel autonomously.

Second Embodiment

In the rescue system 1 according to the first embodiment, the management server 10 determines whether there is a rescued machine in need of rescue and dispatches a rescuing machine if there is a rescued machine. In contrast, in a rescue system 1 according to the present embodiment, a management server 10 selects and dispatches a rescuing machine when the management server 10 receives a request for rescue from any of first working machines R1 and second working machines R2. It should be noted that the general configuration of the rescue system 1 according to the present embodiment is the same as that of the first embodiment and therefore is not described again.

Figure 7:
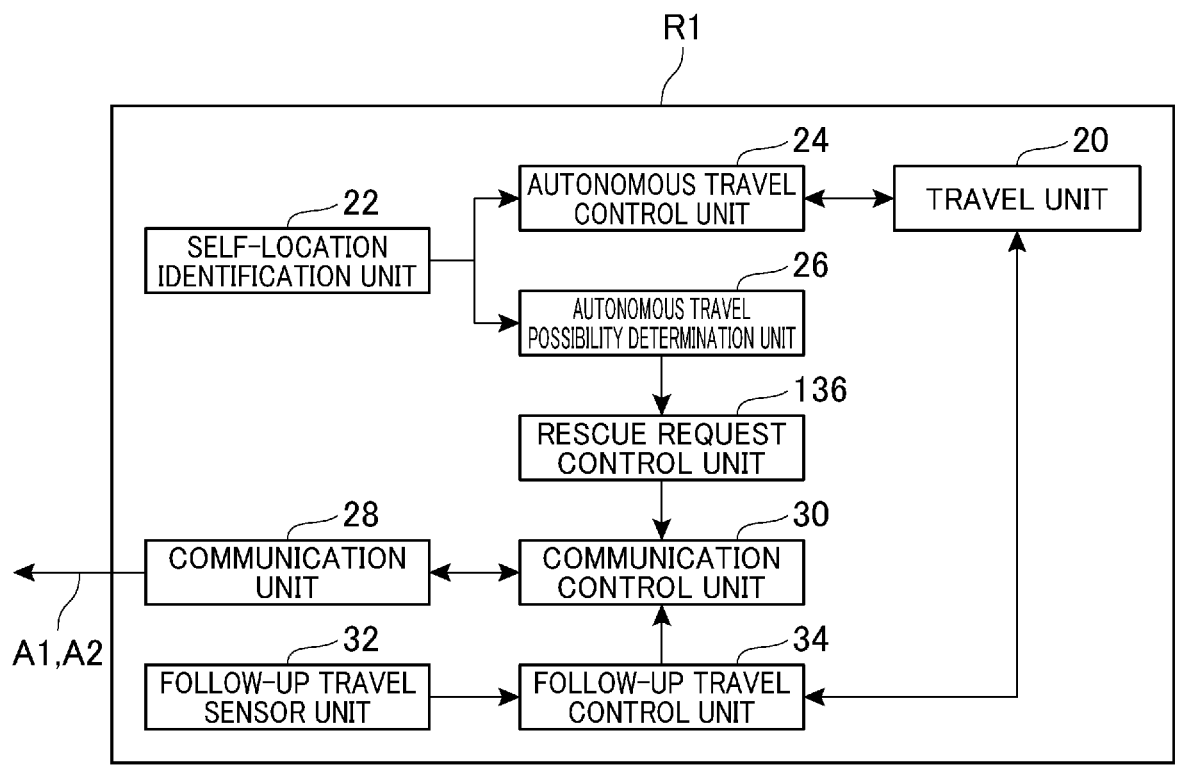
FIG. 7 is a diagram illustrating a functional configuration of a first working machine according to a second embodiment of the present invention.

FIG. 7 is a diagram illustrating a functional configuration of a first working machine R1 according to the present embodiment.

As shown in the figure, the first working machine R1 includes a rescue request control unit 136, which is a difference from the first working machine R1 of the first embodiment.

The rescue request control unit 136 is a computer that generates rescue request information A3 indicating a request for rescue and transmits the rescue request information A3 from a communication unit 28 to the management server 10 under the control of a communication control unit 30 when an autonomous travel possibility determination unit 26 determines that the first working machine R1 cannot travel autonomously for a second predetermined period of time. This rescue request information A3 includes information based on which the management server 10 can identify the current location of the first working machine R1 (the current location itself and a history of travel routes) as well as the above-described follow-up travel possibility information A2.

In the management server 10 according to the present embodiment, a rescue dispatch unit 50 (a rescued machine detection unit 60) detects a rescued machine in need of rescue and identifies the location of the rescued machine based on the rescue request information A3.

In the first working machine R1, the rescue request control unit 136 may be implemented in one computer along with some or all of an autonomous travel control unit 24, the autonomous travel possibility determination unit 26, the communication control unit 30 and a follow-up travel control unit 34.

A functional configuration of a second working machine R2 according to the present embodiment is the same as that of the first working machine R1 except that the self-location identification units 22 of those working machines use different self-location identification techniques from each other.

Figure 8:
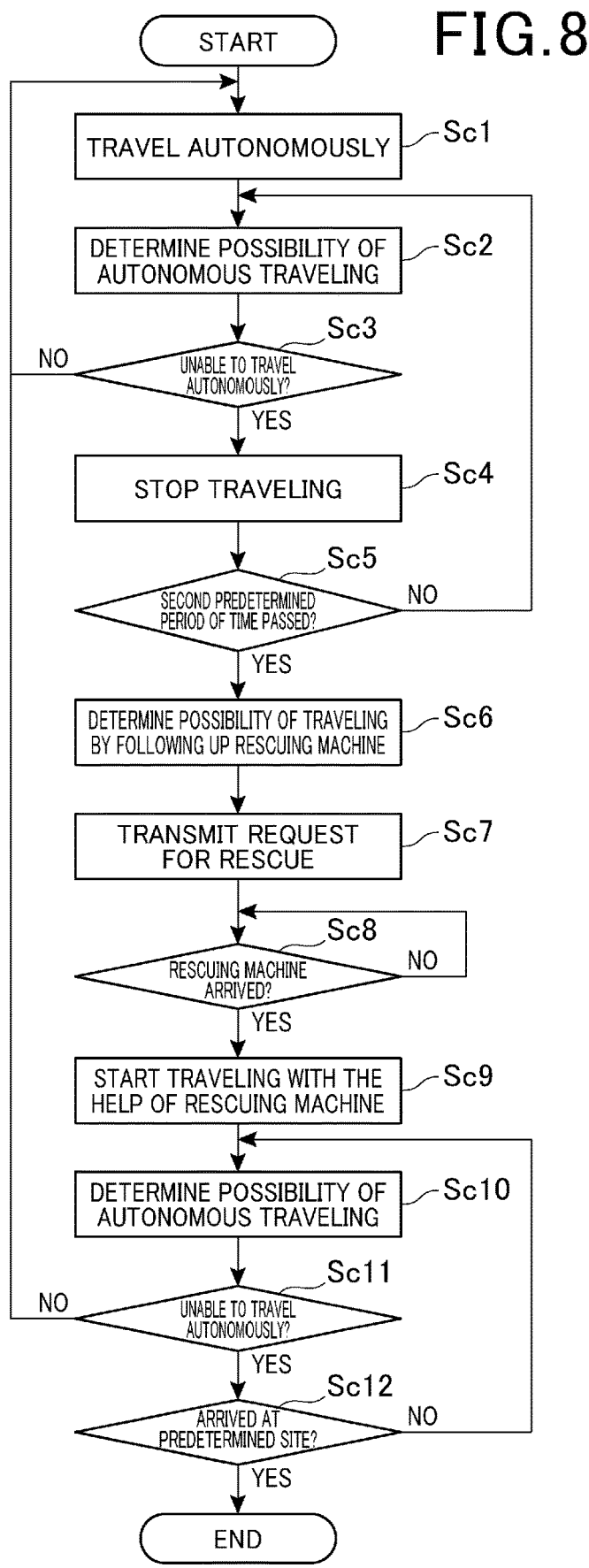
FIG. 8 is a diagram illustrating operations of the first working machine.

FIG. 8 is a diagram illustrating operations of the first working machine R1. Operations of the second working machine R2 is the same as the operations of the first working machine R1.

Once the first working machine R1 starts autonomous traveling under the control of the autonomous travel control unit 24 (Step Sc1), the autonomous travel possibility determination unit 26 first determines whether the first working machine R1 is in a state of being unable to travel autonomously based on a result of the identification by the self-location identification unit 22 (Step Sc2). If the first working machine R1 can travel autonomously (NO in Step Sc3), the processing procedure returns to Step Sc1 and the first working machine R1 continues to travel autonomously (Step Sc1).

Otherwise, if the first working machine R1 is in a state of being unable to travel autonomously (YES in Step Sc3), the autonomous travel control unit 24 performs stop control (Step Sc4) to stop autonomous traveling of the first working machine R1. Before the second predetermined period of time passes (NO in Step Sc5), the autonomous travel possibility determination unit 26 repeatedly determines whether the first working machine R1 is in a state of being unable to travel autonomously (Step Sc2). If it is determined, as a result of this repeated determination, that the first working machine R1 is in a state of being able to travel autonomously (No in Step Sc3), the processing procedure returns to Step Sc1 and the first working machine R1 resumes autonomous traveling (Step Sc1).

Accordingly, if a problem causing determining self-location to be unable is temporary so as to disappear during the second predetermined period of time, the first working machine R1 can resume autonomous traveling and get back to work immediately after the problem disappears.

If the first working machine R1 is in a state of being unable to travel autonomously throughout the second predetermined period of time (YES in Step Sc5), the follow-up travel control unit 34 of the first working machine R1 determines whether the first working machine R1 can travel by following up a rescuing machine based on the operating status of a follow-up travel sensor unit 32 (Step Sc6).

After that, the communication control unit 30 generates follow-up travel possibility information A2 based on a result of this determination and transmits, to the management server 10 along with the above-mentioned rescue request information A3, the follow-up travel possibility information A2 and information usable for identifying a location at which the first working machine R1 is in a state of being unable to travel autonomously (Step Sc7). The information usable for identifying a location at which the first working machine R1 is in a state of being unable to travel autonomously includes the last (most recent) self-location where it is determined that the first working machine R1 can travel autonomously and a travel history of the first working machine R1 up to the current location.

The management server 10 detects the first working machine R1 being in a state of being unable to travel autonomously by receiving such rescue request information A3, selects a suitable rescuing machine from among the first working machines R1, the second working machines R2, first tow working machines RA1 and second tow working machines RA2 based on the follow-up travel possibility information A2 and the same criteria as those used in the first embodiment, and dispatches the selected rescuing machine to the rescue.

When the rescuing machine reaches the first working machine R1 (YES in Step Sc8), operations from Step Sc9 to Step Sc12 are performed. The operations from Step Sc9 to Step Sc12 are similar to the operations from Step Sb9 to Step Sb12 shown in FIG. 6 in the first embodiment, and thus are not described again.

The present embodiment has the following effects.

In the present embodiment, each of the first working machines R1 and the second working machines R2 includes the communication control unit 30 that performs control to transmit to the management server 10 rescue request information A3 including information usable for identifying a location where the working machine is in a state of being unable to travel autonomously if the autonomous travel possibility determination unit determines that the working machine is in a state of being unable to travel autonomously for the second predetermined period of time.

This enables the first working machines R1 and the second working machines R2 to ask the management server 10 for rescue at any suitable timing when the first working machines R1 and the second working machines R2 get into a state of being unable travel autonomously.

(Variations of Second Embodiment)

In the present embodiment, when the first working machines R1 and the second working machines R2 cannot travel by following up a rescuing machine, the first working machines R1 and the second working machines R2 may include information indicating that an autonomous working machine having towing capability should be selected as a rescuing machine in rescue request information A3 when the first working machines R1 and the second working machines R2 transmit the rescue request information A3. In this case, the management server 10 selects a rescuing machine from among the first tow working machines RA1 and the second tow working machines R2 if the management server 10 is notified that an autonomous working machine having towing capability should be selected as a rescuing machine.

As will be appreciated by those skilled in the art, the first embodiment and the second embodiment are merely examples of an aspect of the present invention and other modifications and applications may be made arbitrarily without departing from the spirit and scope of the present invention.

REFERENCE SIGNS LIST

1 Rescue system
2 Body
4 Towing gear (towing means)
10 Management server (management device)
20 Travel unit
22 Self-location identification unit
24 Autonomous travel control unit
26 Autonomous travel possibility determination unit
28 Communication unit
30 Communication control unit (information transmission control means)
32 Follow-up travel sensor unit (rescuing machine detection means)
34 Follow-up travel control unit (follow-up travel control means)
50 Rescue dispatch unit (rescue dispatch means)
52 Storage unit (storage means)
136 Rescue request control unit (rescue request control means)
A1 Autonomous travel possibility information
A2 Follow-up travel possibility information
A3 Rescue request information R1 First working machine (autonomous working machine)
R2 Second working machine (autonomous working machine)
RA1 First tow working machine (autonomous working machine)
RA2 Second tow working machine (autonomous working machine)

What is claimed is:

1. A rescue system comprising a plurality of autonomous working machines and a management device capable of communicating with each of the autonomous working machines, wherein
each of the autonomous working machines comprises a working machine side processor, wherein
the working machine side processor includes:
self-location identification means for identifying a self-location of the autonomous working machine, and
autonomous travel possibility determination means for determining whether the autonomous working machine is able to travel autonomously based on a result of identification by the self-location identification means, and
the management device comprises a management device side processor, wherein
the management device side processor includes:
rescue dispatch means for dispatching an another autonomous working machine, which is a rescuing autonomous working machine, to a rescue of the autonomous working machine, which is a rescued autonomous working machine, and which is determined by the autonomous travel possibility determination means as being in a state of being unable to travel autonomously, wherein
each of the autonomous working machines comprises a camera for detecting the other of said plurality of autonomous working machines,
the working machine side processor includes a follow-up travel control unit that recognizes the rescuing autonomous working machine in an image captured by the camera of the rescued autonomous working machine and controls wheels and steering angles of the rescued autonomous working machine so that the rescued autonomous working machine travels by following up the rescuing autonomous working machine based on the image captured by the camera of the rescued autonomous working machine even when the autonomous travel possibility determination means determines that the rescued autonomous working machine is in a state of being unable to travel autonomously,
the follow-up travel control unit determines whether or not a follow-up travel in which the rescued autonomous working machine travels by following up a movement of the rescuing autonomous working machine based on an operating status of the camera of the rescued autonomous working machine is possible, and transmits a result of the determination to the management device, and
when the result of the determination of the follow-up travel control unit indicates that the follow-up travel in which the rescued autonomous working machine follows the rescuing autonomous working machine is not possible, the management device side processor dispatches a further of said plurality of autonomous working machines having a rescue means.

2. The rescue system according to claim 1, wherein the working machine side processor further comprises information transmission control means for performing control to intermittently transmit, to the management device, autonomous travel possibility information indicating a result of determining whether the autonomous working machine is able to travel autonomously, and
the rescue dispatch means of the management device side processor detects the autonomous working machine being in a state of being unable to travel autonomously for a first predetermined period of time based on the autonomous travel possibility information, and dispatches the rescuing autonomous working machine to the rescue of the detected autonomous working machine.

3. The rescue system according to claim 1, wherein the working machine side processor further comprises rescue request control means for performing control to transmit, to the management device, information usable for identifying a location at which the autonomous working machine is in a state of being unable to travel autonomously and a request for rescue if the autonomous travel possibility determination means determines that the autonomous working machine is in a state of being unable to travel autonomously for a second predetermined period of time.

4. The rescue system according to claim 1, wherein the rescue dispatch means of the management device side processor dispatches an autonomous working machine of which the self-location identification means uses a self-location identification technique different from a self-location identification technique used in the autonomous working machine to be rescued.

5. The rescue system according to claim 4, wherein the rescue dispatch means of the management device side processor dispatches an autonomous working machine located closest to the autonomous working machine to be rescued.

6. The rescue system according to claim 1, wherein the working machine side processor resumes autonomous traveling if the autonomous travel possibility determination means determines that the autonomous working machine is in a state of being able to travel autonomously when the rescued autonomous working machine is moving with an aid of the rescuing or further autonomous working machine.

7. The rescue system according to claim 1, wherein the management device further comprises a memory for storing information on a location at which the autonomous working machine to be rescued is in a state of being unable to travel autonomously.

* * * * *